June 26, 1956    L. REEVE    2,752,223
PRODUCTION OF FERRIC CHLORIDE
Filed Dec. 29, 1952
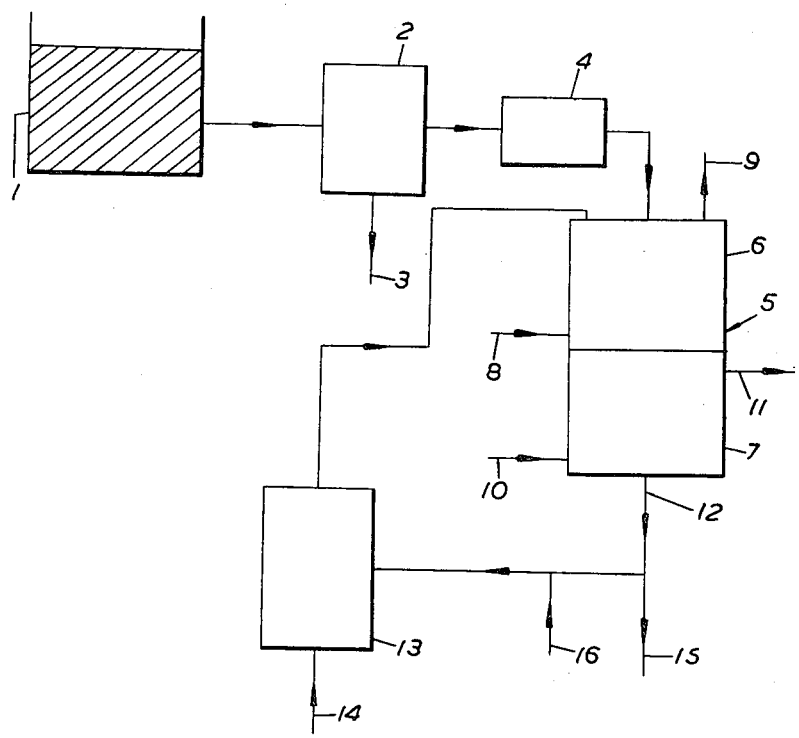
Inventor
LEWIS REEVE
By
Bailey, Stephens & Huettig
Attorneys

United States Patent Office 2,752,223
Patented June 26, 1956

2,752,223

PRODUCTION OF FERRIC CHLORIDE

Lewis Reeve, Sheffield, England, assignor to The United Steel Companies Limited, Sheffield, England Application December 29, 1952, Serial No. 328,341

Claims priority, application Great Britain January 1, 1952

6 Claims. (Cl. 23—87)

This invention relates to the production of ferric chloride.

If the iron in lower-grade iron ore is converted to ferric chloride by treatment with hydrochloric acid, according to the reaction

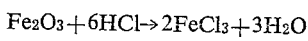

the resultant ferric chloride may be converted either to substantially pure ferric oxide, which can be used in a blast furnace instead of iron ore, or to sponge iron, in accordance with the following equations:

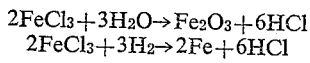

The proposals made higherto for carrying out the chloridising process have involved treating the ore with hydrogen chloride (gaseous HCl) and distilling the ferric chloride from the residue of the ore.

Although these gaseous processes have many advantages, it is usually necessary to crush the ore to fine particles, and, if the ore is wet, to dry it.

It is an object of this invention to obtain substantially pure ferric chloride from iron ore or other material containing iron oxide, in particular from low-grade bedded ores containing less than 45% iron when mixed, without the necessity of crushing or drying the ore or other material.

It is a further object of the invention to obtain gaseous ferric chloride which can subsequently be hydrolysed to give ferric oxide or reduced to give sponge iron.

Yet another object of the invention is to separate iron and aluminium from a material containing them as ferric oxide and alumina.

According to this invention iron ore or other material containing iron oxide is treated with hydrochloric acid (aqueous HCl) to form a chloride solution in which the iron is present as ferric chloride, and the ferric chloride is distilled from the solution in the presence of enough hydrogen chloride to prevent the hydrolysis of the ferric chloride to ferric oxide.

An ore used in my invention need not be finely divided, so the need for crushing is avoided. Moreover there is, of course, no need to dry the ore, although if the iron ore contains ferrous compounds, such as ferrous carbonate, it should first be roasted under oxidising conditions to convert the ferrous compounds to ferric oxide.

In carrying out my invention, the iron ore or the like is preferably dissolved in the minimum of aqueous hydrochloric acid, which may be heated and stirred, if desired. The solution may then be allowed to stand in a tank and the insoluble matter, consisting largely of silica, will thereupon settle to the bottom of the tank. The supernatant liquid will consist of a solution of ferric chloride and other chlorides, depending upon the type of ore or other material used. These chlorides may include those of aluminium, calcium, magnesium and manganese.

Before being distilled the chloride solution is preferably concentrated by evaporation of a proportion of its water by steam coils or similar means.

The ferric chloride may be distilled from the chloride solution in a hot spray-drying chamber or in externally heated pipes, but more conveniently it is done on the surface of a heated refractory material. The refractory material, which must be capable of withstanding the temperatures employed without softening or decomposition and not be chemically attacked by the gases and vapours present, is formed into a bed and the solution is sprayed into it. The distillation is effected in the presence of a stream of hydrogen chloride. The volume of hydrogen chloride should be at least equal to the volume of the steam liberated from the solution of chlorides, and it may be as high as six or more times this volume, depending upon the temperature employed, the volume of hydrogen chloride being greater the higher the temperature. The range of temperatures possible is from 212 to 930° F., but the preferred temperature employed for distillation is between 570 and 750° F. Under these conditions ferric chloride vapour distils off in the presence of excess hydrogen chloride and steam.

When, as is preferred, the distillation is effected on the surface of heated refractory material, a suitable material is silica brick or rock, or a silicious flint or gravel. The material may be in lump form or in small pieces 1/10 inch across down to 200 mesh in size. If an ore was used as the starting material and was finely ground the finely divided silicious material from the original ore which remains insoluble in the acid may be used. When using fine material the bed should be maintained in the so-called fluidised condition by being supported on one or more perforated diaphragms, through which hydrogen chloride is pumped at a linear velocity of 0.2 to 3 feet per second, depending upon the size of the particles used. Under these conditions the particles will be maintained in a state of turbulence, resembling a boiling fluid, though the gas velocity must not be so high as to blow all the particles completely out of the bed.

Fluidising of the small particles is essential to prevent them becoming locked together by the deposition upon them of the remaining material in the injected iron ore solution. These materials may include, as already indicated, the chlorides of lime, magnesia and manganese, which will be deposited upon the fluidised refractory particles as the dried chlorides. Any aluminum chloride present is reconverted to alumina under the conditions described, and is also deposited upon the particles. Phosphorus in the original ore is deposited largely as calcium phosphate. A similar deposition will of course take place upon hot lumpy refractory material if used, and there will be a similar, though less marked tendency, for the lumps to become cemented together by the dried-out deposit. This may be prevented by keeping the particles in slight relative motion, as by feeding them into a vertical shaft furnace and discharging them at the bottom; or by feeding them into a rotary hearth furnace of the Hereshof type.

The hydrogen chloride may be regenerated from the dried chlorides of calcium, magnesium and manganese on the surface of the refractory material by treatment in a separate re-heating vessel with steam mixed with air, inert gas to waste combustion gases, at a temperature of 570 to 1650° F., as described in my application Serial No. 328,520 of even date herewith, now U. S. Patent No. 2,726,142. If this regeneration is to proceed at a reasonable speed, the refractory material should contain silica or alumina presumably to combine with the oxides formed from the chlorides.

The preferred process according to the invention is illustrated by the flow sheet constituting the accompanying drawing. In this process ore is dissolved in hydrochloric acid in a vessel 1 to produce a slurry which flows to a filter 2. Here silica and other insoluble material are removed as shown at 3, and the filtrate flows to an evaporator 4. From this the concentrated solution flows to the distillation apparatus 5.

It will be understood that, whether or not the chloride solution is partly evaporated before being subjected to the distillation step, not only the ferric chloride but also the remaining water in the solution will be evaporated during the distillation step. Although the steam and ferric chloride may be removed together as indicated above, it is preferred to effect the distillation in two stages at two separate temperatures so as to remove the steam first and the ferric chloride afterwards.

The distillation apparatus 5 shown in Figure 1 contains two compartments 6 and 7 in which hot refractory material is maintained in a fluidised state. The concentrated solution enters the compartment 6 and flows downwardly and hydrogen chloride enters at 8 and flows upwardly to maintain the refractory material fluidised. In this compartment the first stage of the distillation is carried out at a temperature above 212° F., but below 390° F., whereupon most of the water, but practically none of the ferric chloride, is distilled. The distilled water vapour together with excess hydrogen chloride leaves at 9. The chlorides are dried on the refractory material in the compartment 6 and the material and chlorides together flow to the second compartment 7. Here additional hydrogen chloride is introduced at 10 to maintain the refractory material fluidised and the ferric chloride is distilled out in a stream of hydrogen chloride at 11 and may be hydrolysed to ferric oxide or otherwise treated. In the compartment 7 the temperature is maintained at from 390 to 750° F. The advantage of this two-stage process is that as most of the water in the solution is distilled out at low temperatures below 390° F., the volume of hydrogen chloride required to prevent hydrolysis is much lower than at high temperatures. The gas leaving the first compartment 6 at 390° F. may contain as little as 1 volume of hydrogen chloride per volume of steam without retarding the formation of ferric chloride. This ferric chloride can then be distilled off in the next stage at from 390 to 750° F., again using a minimum of hydrogen chloride, since practically all the steam has been removed in the first stage.

The refractory material and remaining chlorides leave the compartment 7 at 12 and flow to a re-heating apparatus 13. It will be understood that the evaporation of water from the chloride solution and the distillation of the ferric chloride and any water remaining both consume heat and if a hot refractory material is used it will cool appreciably during the process. It must therefore be maintained hot. This can be done by the injection of hot combustion gases direct into the distillation apparatus. This, however, is undesirable as these gases mix with the outgoing hydrogen chloride and steam and prevent these latter gases being circulated and used again after the ferric chloride has been removed from them, since the proportion of combustion gases in the circulating mixture would rapidly increase. Indirect heating is therefore preferred, and it is for this reason that the re-heating apparatus 13 is provided. Combustion gases from any convenient source are introduced into this apparatus at 14 so as to re-heat the refractory material to temperatures up to, say 1650° F. This re-heating may be combined with the recovery of hydrogen chloride from the deposited dried chlorides by mixing with the re-heating combustion gases a small quantity of steam as described in my application Serial No. 328,520, filed December 29, 1952, now U. S. Patent No. 2,726,142. The chlorides are converted to the corresponding oxides, which combine with the silica in the refractory material. The re-heated material is returned to the compartment 6 of the distillation apparatus. Continued operation in this manner would increase the proportion of lime and magnesia in the refractory material and it is advisable to bleed off a certain proportion of the refractory material intermittently or continuously from the system as shown at 15, and to replace it by fresh material introduced at 16.

An alternative method of treating the dried chlorides of calcium, magnesium and manganese so as to remove them from all or part of the refractory material is to cool the mixture of materials leaving the compartment 7 of the distillation apparatus to below 212° F., and then to treat this mixture with enough water to dissolve the chlorides and carry them away. Much of the adherent alumina and calcium phosphate also separates from the underlying refractory material during such water treatment. The dissolved chlorides can be treated for manganese recovery if desired by any suitable method. The alumina and calcium phosphate may also be recovered by washing or flotation methods, or by re-solution in hydrochloric acid.

If the starting material contains aluminum, it is advantageous to precipitate as much as possible of this as hydrated aluminum chloride, $AlCl_3.6H_2O$, before the distillation. The precipitated aluminum chloride may be separated from the mother liquor by settling or filtration and may be treated for the recovery of alumina and hydrochloric acid in any suitable way. The remaining solution containing the chlorides of iron, calcium, magnesium and manganese may then be sprayed into a hot evaporating vessel as already described.

The precipitation of the aluminum chloride may be effected by passing hydrogen chloride through the concentrated solution of chlorides after the evaporation step, or through the original solution if the evaporation step is omitted. The hydrated aluminum chloride may also be precipitated by sufficient evaporation of the solution.

When the distilled ferric chloride is converted to either ferric oxide or sponge iron in accordance with the equations given above, the hydrogen chloride gas recovered may be used partly to treat further ore (after solution of the gas in water to produce hydrochloric acid), and partly to provide the gaseous hydrogen chloride atmosphere used to distil off the ferric chloride. Part of the steam produced in the original distillation may be finally condensed, carrying with it some of the hydrogen chloride gas, the aqueous hydrochloric acid so produced being used for dissolving more ore.

The process of my invention results in a substantially complete extraction of the iron from the ore as ferric chloride and a substantially complete recovery of all the hydrochloric acid used for the original treatment of the ore, which acid may then be used for the treatment of fresh ore.

The ferric chloride obtained in this manner, and accordingly the ferric oxide or sponge iron obtained therefrom, is substantially pure and free from sulphur, phosphorus, silicon or other impurities, whatever may have been the content of these impurities in the original ore.

My process is particularly applicable to low-grade bedded ores containing less than 45% iron when mined, such as those ores which are mined in Alabama, and the taconite ores of the Lake Superior region. The ores mined in England in Lincolnshire, Northamptonshire and Oxfordshire and the similar ores mined in Luxembourg and Alsace Lorraine; and in Germany (particularly in Baden, Wurtemberg, Bavaria, and in the Salzgitter Ilsede region) can also advantageously be used in the process. It is preferable, however, that the ores contain not more than 10% of lime plus magnesia.

My process is also applicable to materials containing iron oxide but not normally regarded as iron ores, such as flue dust from blast furnaces or roasted iron pyrites, provided they are soluble in hydrochloric acid with the production of solutions containing ferric chloride, though it is again preferable for such materials not to contain more than 10% of lime plus magnesia.

I claim:
1. In a process for obtaining ferric chloride from a material selected from the group consisting of iron ore and other material containing iron oxide the steps of treating said material with hydrochloric acid to form a chloride solution in which the iron is present as ferric chloride, spraying said solution onto the surface of particulate refractory material at a temperature between 212 and 390° F. to form a dried deposit of ferric chloride upon the surface of said particulate material, said particulate refractory material being in the form of at least one fluidised bed, and heating said particulate refractory material bearing said ferric chloride as a dried deposit in the form of a fluidized bed to a higher temperature between 390 and 750° F. in the presence of a sufficient amount of hydrogen chloride to prevent hydrolysis of the ferric chloride to ferric oxide to vaporize said ferric chloride therefrom.

2. A process according to claim 1, in which a portion of the particulate refractory material is removed from the fluidized beds, reheated and returned to the fluidized beds to maintain the temperature of said fluidized beds.

3. In a process for obtaining ferric chloride from a material selected from the group consisting of iron ore and other material containing iron oxide the steps of treating said material with hydrochloric acid to form a chloride solution in which the iron is present as ferric chloride, said solution also containing at least one chloride of a metal selected from the group consisting of alkali and alkaline earth metals, spraying said solution onto the surface of fluidised particulate refractory material at a temperature between 212 and 390° F., to form a dried deposit of ferric chloride upon the surface of said particulate material and heating said particulate refractory material bearing said ferric chloride and said other chloride or chlorides as a dried deposit in the form of a fluidized bed to a higher temperature between 390 and 750° F. in the presence of a sufficient quantity of hydrogen chloride to prevent hydrolysis of the ferric chloride to ferric oxide to vaporize said ferric chloride therefrom, and then reheating said particulate refractory material bearing said other chloride as a dried deposit in the presence of steam to regenerate hydrogen chloride.

4. In a process for obtaining ferric chloride from a material selected from the group consisting of iron ore and other material containing iron oxide the steps of treating said material with hydrochloric acid to form a chloride solution in which the iron is present as ferric chloride, said solution also containing at least one chloride of a metal selected from the group consisting of alkali and alkaline earth metals, spraying said solution onto the surface of fluidised particulate refractory material at a temperature between 212 and 390° F. to form a dried deposit of said ferric chloride and other chloride upon the surface of said particulate material and heating said particulate refractory material bearing said ferric chloride and said other chloride as a dried deposit in the form of a fluidized bed to a higher temperature between 390 and 750° F. in the presence of a sufficient quantity of hydrogen chloride to prevent hydrolysis of the ferric chloride to ferric oxide to vaporize said ferric chloride therefrom, washing said particulate refractory material bearing said other chloride, and hydrolysing said other chloride or chlorides to regenerate hydrogen chloride.

5. In a process for treating a material selected from the group consisting of an ore and other material containing iron oxide and alumina to separate iron and aluminum from impurities the steps of treating said material with hydrochloric acid to form a solution of ferric chloride and aluminum chloride, separating said solution from the undissolved residue, precipitating said aluminum chloride from said solution as hydrated aluminum chloride, removing said hydrated aluminum chloride, driving off a substantial portion of the water from the remaining solution as steam at a temperature below that at which substantial portions of $FeCl_3$ are distilled and subsequently heating the residue of said solution in the presence of a sufficient quantity of hydrogen chloride to prevent hydrolysis of the ferric chloride to a higher temperature to vaporize substantially all of the ferric chloride in such residue.

6. In a process according to claim 5, in which said aluminum chloride is precipitated as hydrated aluminum chloride by passing hydrogen chloride into said solution.

References Cited in the file of this patent

UNITED STATES PATENTS

| | | |
|---|---|---|
| 2,030,885 | Maxim | Feb. 18, 1936 |
| 2,291,206 | Bowes | July 28, 1942 |
| 2,406,577 | Alessandroni | Aug. 27, 1946 |
| 2,502,327 | Krchma | Mar. 28, 1950 |
| 2,665,191 | Graham et al. | Jan. 5, 1954 |

FOREIGN PATENTS

| | | |
|---|---|---|
| 10,062 | Great Britain | 1890 |
| 100,517 | Great Britain | June 1, 1916 |
| 290,568 | Great Britain | May 23, 1929 |